June 24, 1958 N. S. KORNETZ 2,840,636
SYNC SEPARATION FOR TV RECEIVERS
Filed Aug. 17, 1953
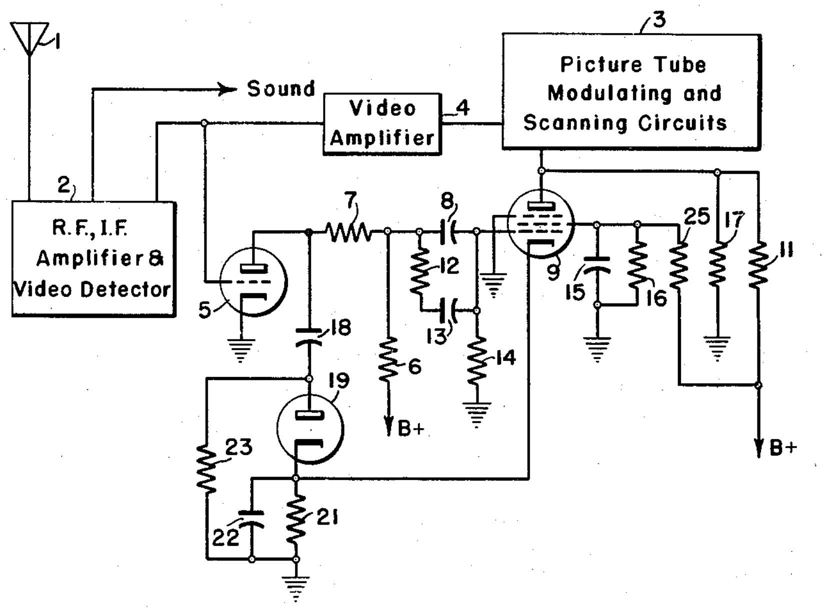
WITNESSES:
John E. Healy
R. G. Brodahl
INVENTOR
Norman S. Kornetz.
BY
F. E. Browder
ATTORNEY United States Patent Office 2,840,636

Patented June 24, 1958

2,840,636

SYNC SEPARATOR FOR TV RECEIVERS

Norman S. Kornetz, Lewisburg, Pa., assignor to Westinghouse Electric Corporation, East Pittsburgh, Pa., a corporation of Pennsylvania Application August 17, 1953, Serial No. 374,717

6 Claims. (Cl. 178—7.3)

My invention relates to television and other picture reproducing systems and in particular relates to an arrangement for eliminating or greatly reducing interference with sync signal separation by random noise pulses and so called "static" present in the vicinity of such systems.

As is well known to those skilled in the television art, the Federal Communications Commission has prescribed that commercial television transmitters shall send out signals in which there intervenes between the transmission of successive lines of the picture information a "sync" (i. e. synchronizing) pulse which is "blacker-than-black"; that is to say, a pulse of carrier current which has an amplitude greater than any modulation representing the pictured scene. In the conventional receivers, these sync pulses are diverted to a branch circuit which picture modulated currents do not traverse by providing the branch with a portal tube so biased that only the "blacker-than-black" sync pulses rise above its cut-off, while picture modulations are too small in amplitude to attain access. This bias is conventionally provided by what is, in effect, a resistor-shunted capacitor in the grid circuit of the portal-tube, the capacitor being proportioned to stand charged during picture line transmission to a voltage a little short of the sync pulse amplitude, thus letting the sync pulse through to the portal tube output circuit when it arrives.

Such an arrangement as the above suffers from the disadvantage that vagrant pulses of "static" are likely to be met in practice of amplitude as great or greater than weak signals, and which tend to charge the above-mentioned grid-circuit capacitor. It sometimes happens that several such pulses arrive in rapid succession and charge the grid capacitor, before the shunting resistor dissipates their effect, to a degree great enough so that the sync signals are unable to break through the counter-bias to the sync separator output channel. Thus, their synchronizing effect is lost until the bypass resistor has time to dissipate the purious charge from the capacitor, and in the interval, the line scanning may depart seriously from synchronism with that at the transmitter with highly unsatisfactory image reproduction a consequence.

In accordance with my present invention, I prevent or greatly mitigate the above-described defects by providing a noise clipper which provides a bypass path for the spurious pulse across a resistor in the cathode circuit of the sync separator tube which counteracts the effect on the sync separator output of the spurious pulse which arrives at the grid of the sync separator in conventional fashion.

One object of my invention is accordingly to provide an improved receiver for television and other synchronized signals.

Another object is to provide a synchronized signal receiver which shall be little affected by static and other spurious signal pulses.

Another object is to provide an improved synchronizing channel for transmission systems in which substantial simultaneity of events must be maintained at two spaced localities.

Still another object is to provide a means for eliminating or greatly reducing the effects in a synchronizing circuit of random incoming pulses of substantial intensity.

Other objects of my invention will become apparent to those skilled in the art upon reading the following description taken in connection with the drawings in which the single figure is a schematic diagram of a television receiver embodying my invention, certain conventional portions of the circuit being indicated by block diagrams.

Referring in detail to the drawings, a television receiver embodying my invention may comprise an antenna 1 feeding R. F. and I. F. amplifiers and a second detector 2 of conventional type supplying a picture tube modulating and scanning section 3 through a video amplifier channel 4 also of conventional type and so needing no detailed description here. The scanning beam of the picture tube in picture section 3 is maintained in synchronism with that at the transmitter (not shown) by means of sync pulses which are part of the composite video signal, which sync pulses are impressed on the grid of a sync amplifier 5 having a grounded cathode as well known to those skilled in this art. The anode of sync amplifier 5 is supplied from the positive terminal B+ of a direct current source through a pair of resistors 6 and 7. The junction of resistors 6 and 7 is connected through a capacitor 8 to the grid of a sync separator tube 9 which may suitably be a pentode having its anode connected to a scanning generator circuit (not shown) of conventional type in picture section 3, and also through a load resistor 11 to terminal B+. The capacitor 8 is shunted by a resistor 12 in series with a capacitor 13 to form a bypass of substantially lower impedance than capacitor 8 at the field sync frequency but of substantially higher impedance than capacitor 8 at the line sync frequency. The grid of sync separator tube 9 is grounded through a resistor 14. The screen grid of pentode 9 is grounded through a capacitor 15 shunted by a resistor 16, and is connected to the positive terminal B+ in the usual fashion through a resistor 25. The anode of pentode 9 is grounded through a conventional load resistor 17. The circuit so far described would separate sync pulses in very much the same way as a conventional sync separator circuit.

The anode of the sync amplifier 5 is connected through a capacitor 18 to the anode of a rectifier tube 19 having its cathode connected to the cathode of sync separator 9 and grounded through a resistor 21 shunted by a capacitor 22. The anode of rectifier 19 is grounded through a resistor 23.

Typical values for the various circuit elements shown are given in the following tabulation for a receiver operating on the standard FCC picture transmission.

| Resistors, #: | | |
|---|---|---|
| 6 | ohms | 4700 |
| 7 | do | 2200 |
| 11 | do approx. | 270,000 |
| 12 | do | 470,000 |
| 14 | megohm | 1 |
| 17 | ohms approx. | 33,000 |
| 21 | do | 2200 |
| 23 | do | 680,000 |
| 16 | do | 220,000 |
| 25 | do | 390,000 |

| Capacitor, #: | Micromicro-farads |
|---|---|
| 8 | 270 |
| 13 | 10,000 |
| 15 | 100,000 |
| 18 | 100,000 |
| 22 | 270 |

Tube types—source B+=volts:

| | |
|---|---|
| #5 | ½ 12AT7. |
| #19 | ½ 12BH7 (diode connected). |
| #9 | 6AU6 |

It has been found that with the charging time of capacitor 18 large relative to that of capacitors 8 and 13, as indicated by the foregoing values, any noise pulse which appears at the plate of sync amplifier 5 is passed through rectifier 19 to the cathode resistor 21 which is common to rectifier 19 and sync separator 9. The amplitude of this pulse will be greater for the first pulse than for several pulses in succession due to charging of capacitor 18. Application of this pulse to the cathode resistor 21 prevents the charging of capacitor 8 in series with the grid-to-cathode circuit of tube 9 to any great degree. Without the provision of the alternate path for this pulse, said path including cathode resistor 21, the grid of tube 9 would become substantially more positive than the cathode of tube 9 to cause an appreciable grid current to flow and charge capacitor 8. If capacitor 8 were to become so charged, the tube 9 temporarily cannot perform its sync separation function due to the biasing of tube 9 beyond cutoff such that the sync pulse level would be unable to exceed this bias voltage on tube 9. In accordance with my invention this undesirable charging of capacitor 8 is prevented.

The voltage applied to the grid of sync separator tube 9 is tapped down by the divider circuit including resistors 6 and 7, whereas the pulse voltage which is passed through to the cathode of tube 9 is not so tapped down or divided, and hence in general the latter voltage is greater than the former voltage. However, in actual practice circuit components may be given such values that said former voltage may be the greater.

Accordingly, the spurious or noise pulses effectively gate off the flow of grid current through the capacitor 8, which current is the undesired charging current for the capacitor 8.

Prevention of grid current flow to charge capacitor 8 substantially avoids disturbance by noise pulses of the normal action of the capacitors 8 and 13, resistor 12 and tube 9 in sync separation.

While I have shown my invention in only one form, it will be obvious to those skilled in the art that it is not so limited but is susceptible of various other changes and modifications without departing from the spirit thereof. For example, if desired a suitable amplifier may be provided between the cathode of tube 9 and the ungrounded end of resistor 21 to even more effectively gate off or cut off the flow of the undesired grid current which otherwise would objectionably charge capacitor 8 as hereinbefore described.

I claim as my invention:

1. In a television receiver adapted to receive television signals having a recurrent sychronizing pulse component, a synchronizing pulse separator channel having an input terminal to which is applied television signals and noise pulses, the recurrent synchronizing pulse component of said television signals extending in a positive direction, said synchronizing pulse separating channel comprisng: a synchronzing signal separator comprising an electron tube having a cathode and a control electrode, means connecting the input terminal of said synchronizing pulse separator channel to the control electrode of said electron tube to apply thereto said signals including said noise pulses having a given polarity, a noise clipper circuit comprising a rectifier having an anode and a cathode, means including a capacitor connecting the input terminal of said synchronizing pulse separator channel to the anode of said rectifier so as to apply to said anode said signals including said noise pulses having said given polarity, a first resistor connected between the cathode of said rectifier and a point of reference potential, a second resistor connected between the anode of said rectifier and said point of reference potential, said capacitor and said second resistor having a large time constant relative to the period between occurrence of said synchronizing pulses so that said rectifier is prevented from conducting heavily by reason of the application of said synchronizing pulses to its anode in the absence of noise pulses having an amplitude greater than that of said synchronizing pulses, and means connecting the cathode of said rectifier to the cathode of said electron tube to apply thereto noise pulses developed across said first resistor when noise pulses having an amplitude greater than that of said synchronizing pulses are applied to the anode of said rectifier, the noise pulses applied to the cathode of said electron tube being of a polarity identical to the polarity of the noise pulses applied to the control electrode of said electron tube.

2. In a television receiver adapted to receive television signals having a recurrent synchronizing pulse component, a synchronizing pulse separator channel having an input terminal to which is applied television signals and noise pulses, the recurrent synchronizing pulse component of said television signals extending in a positive direction, said synchronizing pulse separating channel comprising: a synchronizing signal separator comprising an electron tube having a cathode and a control electrode, means including a first capacitor connecting the input terminal of said synchronizing pulse separator channel to the control electrode of said electron tube to apply thereto said signals including said noise pulses having a given polarity, a noise clipper circuit comprising a rectifier having an anode and a cathode, means including a second capacitor connecting the input terminal of said synchronizing pulse separator channel to the anode of said rectifier so as to apply to said anode said signals including said noise pulses having said given polarity, a first resistor connected between the cathode of said rectifier and a point of reference potential, a second resistor connected between the anode of said rectifier and said point of reference potential, said second capacitor and said second resistor having a large time constant relative to the period between occurrence of said synchronizing pulses so that said rectifier is prevented from conducting heavily by reason of the application of said synchronizing pulses to its anode in the absence of noise pulses having an amplitude greater than that of said synchronizing pulses, and means connecting the cathode of said rectifier to the cathode of said electron tube to apply thereto noise pulses developed across said first resistor when noise pulses having an amplitude greater than that of said synchronizing pulses are applied to the anode of said rectifier, the noise pulses applied to the cathode of said electron tube being of a polarity identical to the polarity of the noise pulses applied to the control electrode of said electron tube whereby the charging of said first capacitor by noise pulses exceeding the amplitude of synchronizing pulses is substantially prevented.

3. In a television receiver adapted to receive television signals having a recurrent synchronizing pulse component, a synchronizing pulse separator channel having an input terminal to which is applied television signals and noise pulses, the recurrent synchronizing pulse component of said television signals extending in a positive direction, said synchronizing pulse separating channel comprising: a synchronizing signal separator comprising an electron tube having a cathode and a control electrode, means including a first capacitor connecting the input terminal of said synchronizing pulse separator channel to the control electrode of said electron tube to apply thereto said signals including said noise pulses having a given polarity, a noise clipper circuit comprising a rectifier having an anode and a cathode, means including a second capacitor connecting the input terminal of said synchronizing pulse separator channel to the anode of said rectifier so as to apply to said anode said signals including said noise pulses having said given polarity, the capacity of said second capacitor being substantially greater than that of said first capacitor, a first resistor connected between the cathode of said rectifier and a point of reference potential, a second resistor connected between the anode of said rectifier and said point of reference potential, said capacitor and said second resistor having a large time constant relative to the period between occurrence of said synchronizing pulses so that said rectifier is prevented from conducting heavily by reason of the application of said synchronizing pulses to its anode in the absence of noise pulses having an amplitude greater than that of said synchronizing pulses, and means connecting the cathode of said rectifier to the cathode of said electron tube to apply thereto noise pulses developed across said first resistor when noise pulses having an amplitude greater than that of said synchronizing pulses are applied to the anode of said rectifier, the noise pulses applied to the cathode of said electron tube being of a polarity identical to the polarity of the noise pulses applied to the control electrode of said electron tube.

4. In a television receiver adapted to receive television signals having a recurrent synchronizing pulse component, a synchronizing pulse separator channel comprising a synchronizing pulse amplifier having an input circuit and an output circuit, said input circuit to which is applied television signals and noise pulses, the recurrent synchronizing pulse component of said television signals extending in a negative direction, a synchronizing signal separator comprising an electron tube having a cathode and a control electrode, means connecting the output circuit of said synchronizing pulse amplifier to the control electrode of said electron tube to apply thereto said signals including said noise pulses having a given polarity, a noise clipper circuit comprising a rectifier having an anode and a cathode, means including a capacitor connecting the input terminal of said synchronizing pulse separator channel to the anode of said rectifier so as to apply to said anode said signals including said noise pulses having said given polarity, a first resistor connected between the cathode of said rectifier and a point of reference potential, a second resistor connected between the anode of said rectifier and said point of reference potential, said capacitor and said second resistor having a large time constant relative to the period between occurrence of said synchronizing pulses so that said rectifier is prevented from conducting heavily by reason of the application of said synchronizing pulses to its anode in the absence of noise pulses having an amplitude greater than that of said synchronizing pulses, and means connecting the cathode of said rectifier to the cathode of said electron tube to apply thereto noise pulses developed across said first resistor when noise pulses having an amplitude greater than that of said synchronizing pulses are applied to the anode of said rectifier, the noise pulses applied to the cathode of said electron tube being of a polarity identical to the polarity of the noise pulses applied to the control electrode of said electron tube.

5. In a receiver adapted to receive signals having a recurrent synchronizing pulse component, a synchronizing pulse separator channel having an input terminal to which is applied said signals and noise pulses, the recurrent synchronizing pulse component of said signals extending in a positive direction, said synchronizing pulse separator channel comprising: a synchronizing signal separator comprising an electron tube having a cathode and a control electrode, means connecting the input terminal of said synchronizing pulse separator channel to the control electrode of said electron tube to apply thereto said signals including said noise pulses having a given polarity, a noise clipper circuit comprising a rectifier having an anode and a cathode, means including a capacitor connecting the input terminal of said synchronizing pulse separator channel to the anode of said rectifier so as to apply to said anode said signals including said noise pulses having said given polarity, a first resistor connected between the cathode of said rectifier and a point of reference potential, a second resistor connected between the anode of said rectifier and said point of reference potential, said capacitor and said second resistor having a large time constant relative to the period between occurrence of said synchronizing pulses so that said rectifier is prevented from conducting heavily by reason of the application of said synchronizing pulses to its anode in the absence of noise pulses having an amplitude greater than that of said synchronizing pulses, and means connecting the cathode of said rectifier to the cathode of said electron tube to apply thereto noise pulses developed across said first resistor when noise pulses having an amplitude greater than that of said synchronizing pulses are applied to the anode of said rectifier, the noise pulses applied to the cathode of said electron tube being of a polarity identical to the polarity of the noise pulses applied to the control electrode of said electron tube.

6. In a transmission system for signals which have a recurrent synchronizing pulse component, a synchronizing pulse separator channel having an input terminal to which is applied said signals and noise pulses, the recurrent synchronizing pulse component of said signals extending in a positive direction, said synchronizing pulse separator channel comprising: a synchronizing signal separator comprising an electron tube having a cathode and a control electrode, means connecting the input terminal of said synchronizing pulse separator channel to the control electrode of said electron tube to apply thereto said signals including said noise pulses having a given polarity, a noise clipper circuit comprising a rectifier having an anode and a cathode, means including a capacitor connecting the input terminal of said synchronizing pulse separator channel to the anode of said rectifier so as to apply to said anode said signals including said noise pulses having said given polarity, a first resistor connected between the cathode of said rectifier and a point of reference potential, a second resistor connected between the anode of said rectifier and said point of reference potential, said capacitor and said second resistor having a large time constant relative to the period between occurrence of said synchronizing pulses so that said rectifier is prevented from conducting heavily by reason of the application of said synchronizing pulses to its anode in the absence of noise pulses having an amplitude greater than that of said synchronizing pulses, and means connecting the cathode of said rectifier to the cathode of said electron tube to apply thereto noise pulses developed across said first resistor when noise pulses having an amplitude greater than that of said synchronizing pulses are applied to the anode of said rectifier, the noise pulses applied to the cathode of said electron tube being of a polarity identical to the polarity of the noise pulses applied to the control electrode of said electron tube.

References Cited in the file of this patent

UNITED STATES PATENTS

| | | |
|---|---|---|
| 2,137,123 | Lewis et al. | Nov. 15, 1938 |
| 2,251,929 | Freeman et al. | Aug. 12, 1941 |
| 2,515,763 | Downie | July 18, 1950 |
| 2,539,374 | Porciau et al. | Jan. 23, 1951 |
| 2,564,554 | Anderson | Aug. 14, 1951 |
| 2,611,821 | Denton | Sept. 23, 1952 |
| 2,752,422 | Alexander | June 26, 1956 |

FOREIGN PATENTS

| | | |
|---|---|---|
| 504,775 | Belgium | Aug. 14, 1951 |
| 109,480 | Australia | Jan. 18, 1940 |

OTHER REFERENCES

Rider's Television Manual, vol. 2, Philco TV, pages 2, 33, 34, 35 (model 48-700), copyrighted 1949.